(12) United States Patent
Manabe

(10) Patent No.: US 6,282,598 B1
(45) Date of Patent: Aug. 28, 2001

(54) PCI BUS SYSTEM WHEREIN TARGET LATENCY INFORMATION ARE TRANSMITTED ALONG WITH A RETRY REQUEST

(75) Inventor: Masao Manabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/062,357

(22) Filed: Apr. 17, 1998

(30) Foreign Application Priority Data

Apr. 18, 1997 (JP) .................................................. 9-101228

(51) Int. Cl.⁷ .................................................. G06F 13/00
(52) U.S. Cl. .................... 710/107; 710/110; 710/240; 710/52; 710/36
(58) Field of Search ................................. 710/107, 118, 710/125, 20, 21, 36, 110, 113, 52, 240, 241, 242, 112

(56) References Cited

U.S. PATENT DOCUMENTS

| | | | | |
|---|---|---|---|---|
| 5,500,808 | * | 3/1996 | Wang | 364/578 |
| 5,555,383 | * | 9/1996 | Elazar et al. | 710/129 |
| 5,610,841 | * | 3/1997 | Tanaka et al. | 364/514 R |
| 5,708,814 | * | 1/1998 | Short et al. | 710/260 |
| 5,748,914 | * | 5/1998 | Barth et al. | 710/105 |
| 5,768,544 | * | 6/1998 | Hauck | 710/118 |
| 5,878,239 | * | 3/1999 | Futura | 710/129 |
| 5,884,052 | * | 3/1999 | Chambers et al. | 710/107 |
| 6,021,483 | * | 2/2000 | Adar et al. | 712/29 |

FOREIGN PATENT DOCUMENTS

| | | |
|---|---|---|
| 273854 | 11/1990 | (JP) . |
| 4102154 | 4/1992 | (JP) . |
| 863427 | 3/1996 | (JP) . |

* cited by examiner

Primary Examiner—Ario Etienne
(74) Attorney, Agent, or Firm—Ostrolenk, Faber, Gerb & Soffen, LLP

(57) ABSTRACT

In a PCI bus system comprising an initiator and a target, wherein data is transferred from the target via a PCI bus in response to access from the initiator, a time intercal period required from access to data transfer is stored as latency information in the target. The latency information is transferred from the target to the initiator in response to access requests from the initiator. The initiator determines the next access timing from the relevant latency information. Thereby, a PCI bus occupation time due to repeated access requests can be shortened.

9 Claims, 5 Drawing Sheets

PCI BUS SYSTEM WHEREIN TARGET LATENCY INFORMATION ARE TRANSMITTED ALONG WITH A RETRY REQUEST

BACKGROUND OF THE INVENTION

The present invention relates to a PCI bus system wherein an initiator and a target are connected via a PCI (Peripheral Component Interconnect) bus.

Generally, a PCI bus system of this type has been formed wherein a central processing unit (CPU) is connected to a PCI bus via a host—PCI bridge (arbiter), and a PCI device is connected to the PCI bus. In such a PCI bus system, an expansion bus bridge is often connected to the PCI bus while an expansion device is connected to this expansion bus bridge via an expansion bus.

In this PCI bus system, data transfer is carried out via a host between connecting the CPU and the host—PCI bridge in synchronism with a 66 MHz clock, for example. On the other hand, data transfer is also carried out via the PCI device or the PCI bus provided between the PCI device and the expansion bus bridge in synchronism with a 33 MHz clock. If the expansion bus is formed by an ISA bus, then data is transferred on the expansion bus in synchronism an 8 MHz clock.

In a system constructed in this way, the data transfer speed on the host bus is about 8 times the data transfer speed on the expansion bus, whilst the data transfer speed on the PCI bus is about 4 times the data transfer speed on the expansion bus. In PCI bus system of this kind, the access operations from the initiator to the target include access operations from the CPU to the PCI device or expansion bus device, and access operations from the PCI device to the expansion bus device. Due to the difference in respective operating speeds, the transfer performance in these access operations is limited by the lower speed device. Each device forming a target is also required to wait for a long period of time until the data for transmission to the initiator is prepared. For example, if the explanation bus device is used as a target, supposing that it takes only three clock counts from an access request until initial data transmission in the expansion bus device, this clock count will represent a long time period of 24 clocks at the host bus. Therefore, before data transmission, the host bus will be in a state of occupation by the target for a long period of time.

It often takes time (latency) from reception of a data read-out request from the initiator until the start of data output, and even if this period of time is long, the bus will be in a state of occupation by the target.

A PCI bus system has been proposed, which involves delayed transactions, whereby, if the bus remains in an occupied state for no purpose, a retry request, is output from the target to the initiator and the bus is provisionally released. In this system, when making access from the initiator to the target, the initiator transmits an address to the target when it is granted right of use of the PCI bus by the arbiter. If the target is temporarily in a state whereby it cannot respond to this access, a response signal is output to the initiator, and a retry request seeking a suspension of data transfer is also transmitted to the initiator.

In this case, having received the retry request, the initiator executes the same access operation again with respect to the target after a prescribed period of time has elapsed. When the access operation is reimplemented, the target will not necessarily have assumed a state which allows it to transfer data, and therefore it is possible that even when the access operation is reimplemented, the target will again issue a retry request to the initiator. Consequently, when delayed transactions are used, since an initiator receiving a retry request does not know the timing at which the transaction request is to be resubmitted, a process of request and retry request is repeated between the initiator and target.

In any case, a composition of this kind entails drawbacks in that the PCI bus is often in an occupied state for no purpose and only a slow transfer performance can be achieved.

It is an object of the present invention to provide a PCI bus system whereby the efficiency of use of the PCI bus is raised and transfer performance from target to initiator can be improved.

It is a further object of the present invention to provide a PCI bus system which employs delayed transactions whereby the efficiency of use of the PCI bus can be improved.

It is yet a further object of the present invention to provide a target which is capable of retaining and transmitting the time period from access to data transfer, namely, latency information.

SUMMARY OF THE INVENTION

According to a mode for implementing the present invention, in a PCI bus system comprising an initiator and a target, which transmits data to the initiator by means of access from the initiator, a PCI bus system is obtained wherein the target comprises means for storing latency information indicating the time period required until the data is transmitted after receiving access from an initiator, and the latency information is transmitted to the initiator when access from the initiator is received.

According to a further mode for implementing the present invention, a target is obtained which is capable of storing the time period required until data is transmitted after receiving access from an initiator, as latency information, and transmitting this information to an initiator in response to an access operation.

DESCRIPTION OF THE PREFERRED EMBODIMENTS

Figure 1:
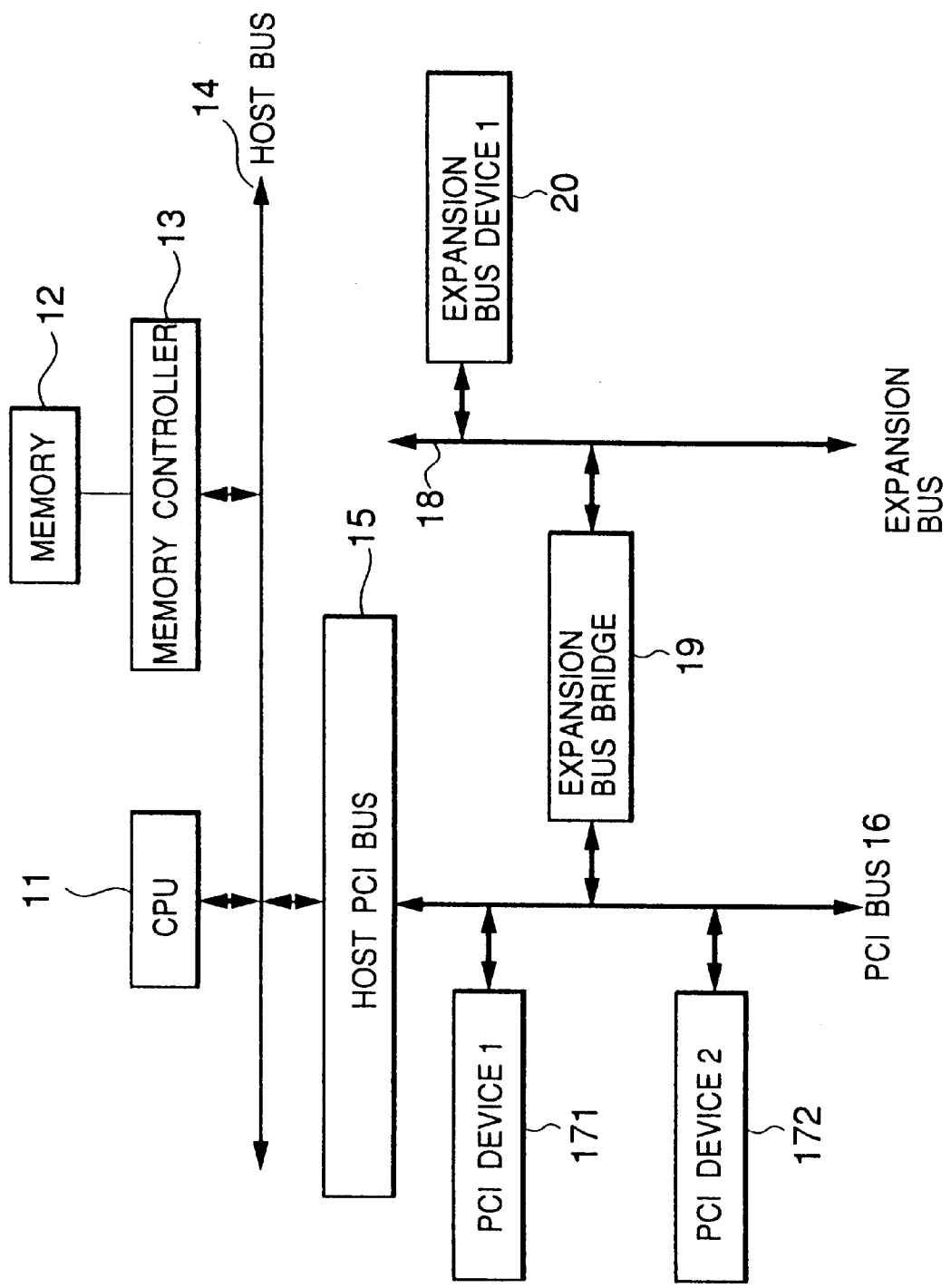
FIG. 1 is a block diagram for schematically describing a PCI bus system to which the present invention is applied.

Now, a PCI bus system according to an embodiment of the present invention will be described with reference to the drawings. As shown in FIG. 1, the PCI bus system comprises a CPU 11, a memory 12, and a memory controller 13 for controlling the memory 12. The CPU 11 and memory controller 13 are connected to a host bus 14.

Moreover, a host PCI bridge 15 is also connected to the host bus 14 is operable as an arbiter. A PCI bus 16 is connected to the host PCI bridge 15 and also to a plurality of PCI devices 171 and 172.

In the example illustrated, an expansion bus 18 is also provided. An expansion bus bridge 19 is connected between the PCI bus 16 and the expansion bus 18, and furthermore, an expansion bus device 20 is connected to the expansion bus 18. With this structure, the PCI bus 16 is used for mutual connection between the devices 171, 172, 20 and other peripheral devices provided in the PCI bus system.

Bridge connections which involve the host PCI bridge 15 and the expansion bus bridge 19, are used a lot in order not to make the PCI bus system depend on a particular CPU and to readily couple other bus systems.

In the PCI bus system, the master device which is to carry out data transfer on the PCI bus 16 is called an initiator, and the device which receives a read request or a write request is called a target. In the example illustrated, the CPU 11, host PCI bridge 15, PCI devices 171, 172 and the expansion bus bridge 19, are operable as initiators, while the expansion bus bridge 19, PCI devices 171, 172, and expansion device 20 are also operable as targets.

The illustrated PCI bus system is assumed to adopt an arbitration scheme and, as a result, only one device is operable as an initiator at any one time. An initiator transmits a use request for the PCI bus 16 to an arbitrator (usually, this function is undertaken by the host PCI bridge 15). Data transfer through the PCI bus 16 can be started only when permission has been received from the arbiter.

Here, data is transferred to the host bus 14 in synchronism with a clock sequence of 66 MHz, while data transfer is carried out through the PCI bus 16 and the expansion bus 18 in synchronism with clock sequence of 33 MHz and 8 MHz, respectively.

Herein, let the CPU 11 and expansion bus device 20 be operable as the target, respectively. It is assumed that the time (specified by the number of clocks) which is taken from the access request of the CPU 11 to the start of data transfer by the expansion bus device 20 is equal to 3 in number on the expansion bus 18. Under the circumstances, a time period of 24 clocks will be wasted on the host bus 14. The time period required from the access request by the initiator to the start of data transfer from the target is called a latency time.

Figure 2:
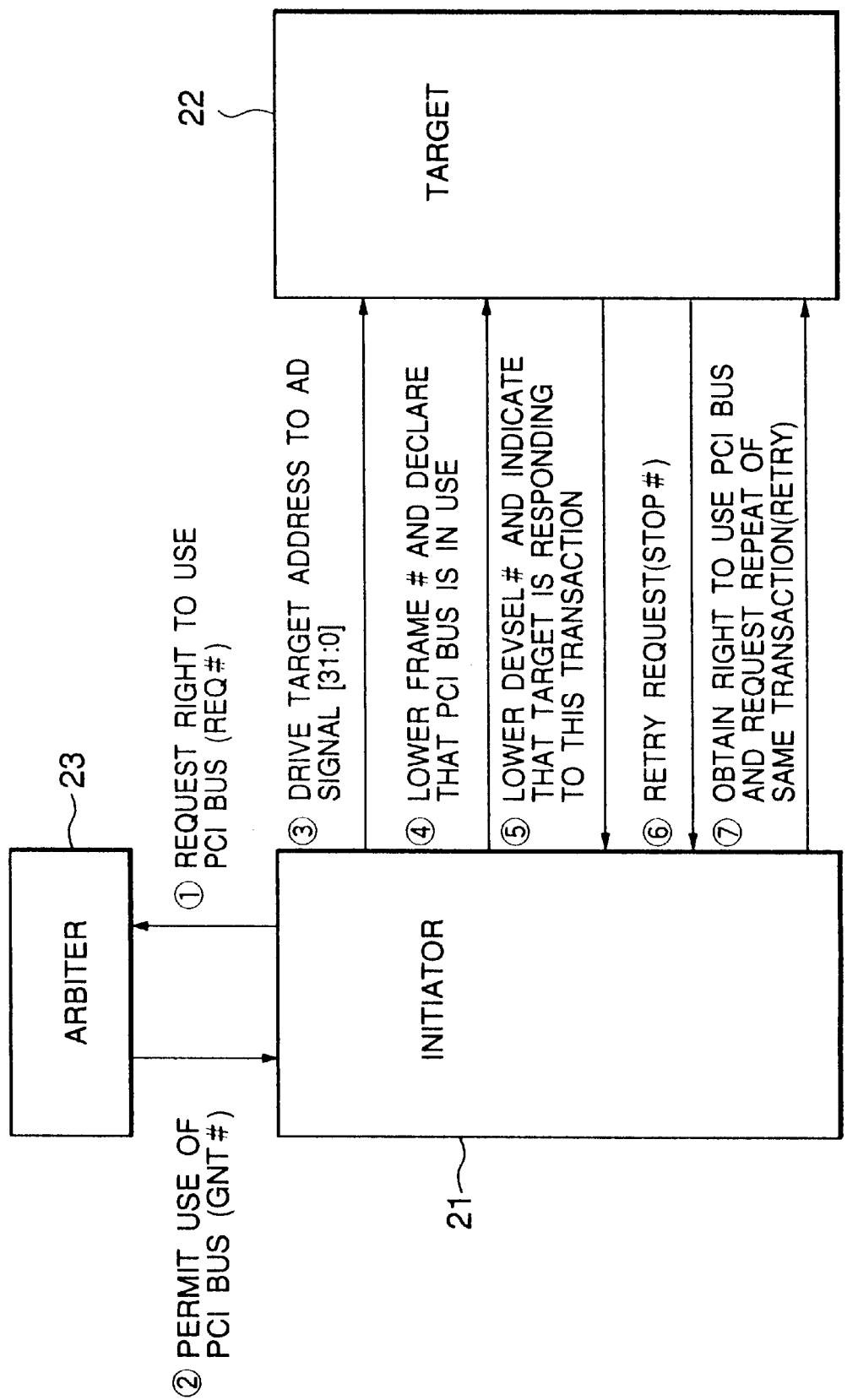
FIG. 2 is a block diagram for describing the operation of the PCI bus system illustrated in FIG. 1 in concrete terms.

The operation of the aforementioned PCI bus system is now described with reference to FIG. 2. In FIG. 2, in order to generalize the description, the operation among the initiator 21, the target 22, and the arbiter 23 is explained. Firstly, the initiator 21 puts the 1-bit REQ# to an active (i.e., assert) state with respect to the arbiter 23, thereby requesting the right to use the PCI bus. When REQ# becomes active, the arbiter 23 renders the 1-bit GNT# into the active (assert) state, and permits the initiator 21 to use the PCI bus.

Responsive to the permission, the initiator 2 transmits an address of the target 22 as an AD signal of 32 bits. Here, the AD signal is produced in the form of a time division multiplexed signal. In this case, the address and the data are switched from one to another in consideration of a phase. The address signal is sent from the initiator 21 and the desired target 22 is driven. In this case, the initiator 21 keeps FRAME# active and declares that the PDCI bus is in use.

Subsequently, the target 22 puts DEVSEL# to the active state to indicate that the target 22 responds to the transfer request from the initiator 21. In this state, when the initiator 21 and target 22 are both put into states where data transfer is possible, they render IRDY# and TRDY# into active state. Under the circumstances, data transfer can be carried out. This means that each of the initiator 21 and the target 22 can determine timing.

In this way, the target 22 can determine the transfer timing by means of TRDY#. On the other hand, when the target 22 cannot respond to transaction for a certain period of time, this belongs about an error. Taking this into consideration, the target 22 produces DEVSEL# to indicate that it can respond to the transaction. In addition, the target 22 can request interruption of a transaction by means of STOP#.

Usually, it is possible to start transaction from the initiator 21 to the target 22 in the above-mentioned manner. On the other hand, the initiator sets FRAME# to the active state to declare that the PCCI bus is in use. In this event, even when the target 22 cannot respond to the FRAME# at once because of internal processing in the target 22, the target 22 can still respond by setting DEVSEL# to the active state, or it can request interruption by STOP#. This interruption request is transmitted from the target 22 to the initiator 21 as a retry request which asks for the same transaction to be repeated.

A processing method called "delayed transaction" is used as a standard for determining the processing implemented in the event of a retry request. According to this standard, a target requests a retry when it judges that a long term is needed to respond to transaction from an initiator. In addition, the target provisionally releases the PCI bus. Thereafter, the target responds to the transaction and carries out data transfer after completion of preparation, when a retry is received from the initiator.

Therefore, according to this delayed transaction standard, the initiator 21 which receives a retry request will produce the same request again after a prescribed period of time has elapsed.

In this way, even if delayed transaction processing is performed, the timing for the next retry is not given to the initiator 21. Therefore, the initiator 21 repeats the retry operation any number of times, each time when the prescribed time period elapses, until the target 22 is put into a state where it can respond. Therefore, the retry operation by the initiator 21 and the retry request from the target 22 are repeated a number of times through the PCI bus. This results in wasting cycles on the bus.

Figure 3:
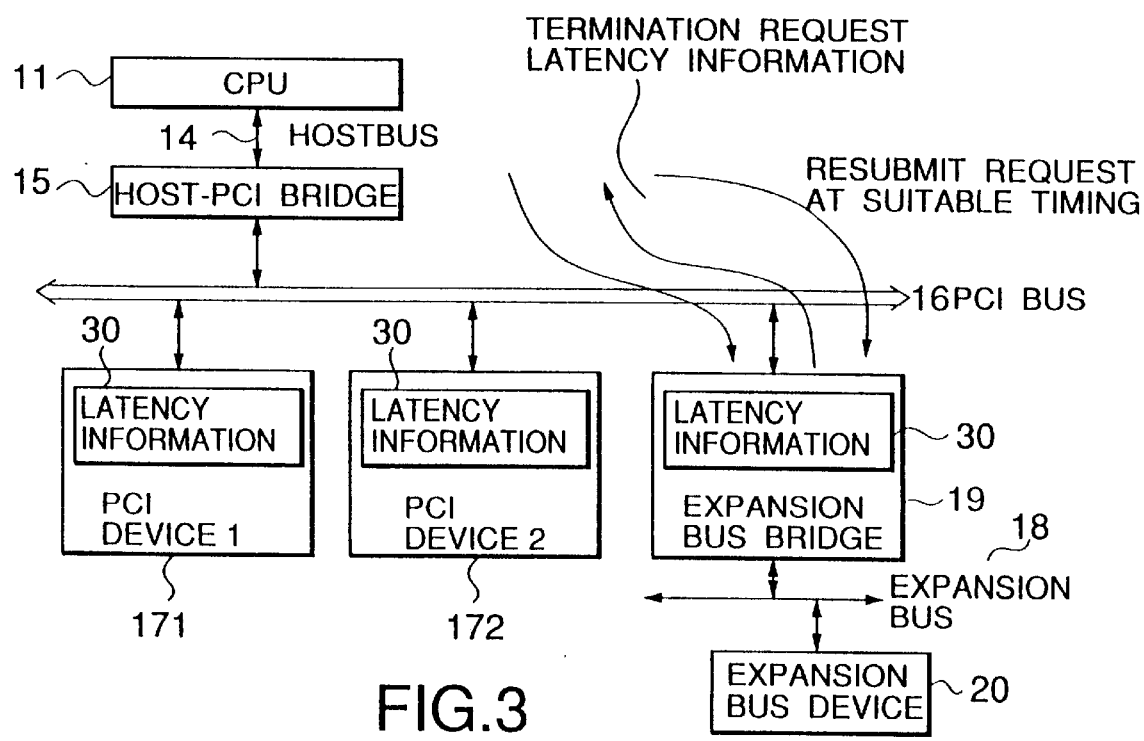
FIG. 3 is a block diagram for describing the composition of a PCI bus system relating to one mode for implementing the present invention.

With reference to FIG. 3, the PCI bus system according to a preferred embodiment, the present invention comprises, like in FIG. 1, a CPU 11, a host PCI bridge 15, a PCI bus 16, PCI devices 171, 172, an expansion bus bridge 19, an expansion bus 18, and an expansion bus device 20. In the example illustrated, in order to simplify the description, the CPU 11 and the host PCI bridge 15 are operable as initiators, while the PCI devices 171, 172 and the expansion bus bridge 19 are operable as targets. With this structure, the expansion bus device 20 connected via the expansion bus 18 to the expansion bus bridge 19 is controlled by the expansion bus bridge 19.

The devices 171, 172, 19 operating as targets are provided with latency registers 30 for indicating the waiting time at that device when a retry request is issued, and the period of time required from receiving an access request (in other words, a transaction request) until initial data transfer is established is stored in each latency register 30 as latency information in the form of a number of clocks. Here, the latency register 30 may be formed using an empty portion of the configuration register provided in the device, namely, an undefined section, or a separate register from this may be used.

Generally, the time required from the reception of an access requesting the target to the start of initial data transfer is equal to one another in each target, even if a distinction between write and read operations is made. Bearing this in mind, in the illustrated example, this time is stored in the latency register 30 as latency information in the form of a specific number of clocks.

In this composition, when booting up the system, that is, when the personal computer power is switched on, for example, the CPU 11, bridge 15 and other initiators read out the latency information for the targets, and use it as a reference for initiator scheduling.

Even if initiator scheduling based on latency information is used, when a retry arises, the target transmits latency information in its latency register 30 to the initiator when it requests a retry. Here, on the PCI bus, the target transmits latency information to the initiator at the same time as STOP#.

When the initiator receives latency information from the target, after waiting for the time period indicated by the latency information, it conducts a retry, in other words, it resubmits a transaction request.

Figure 4:
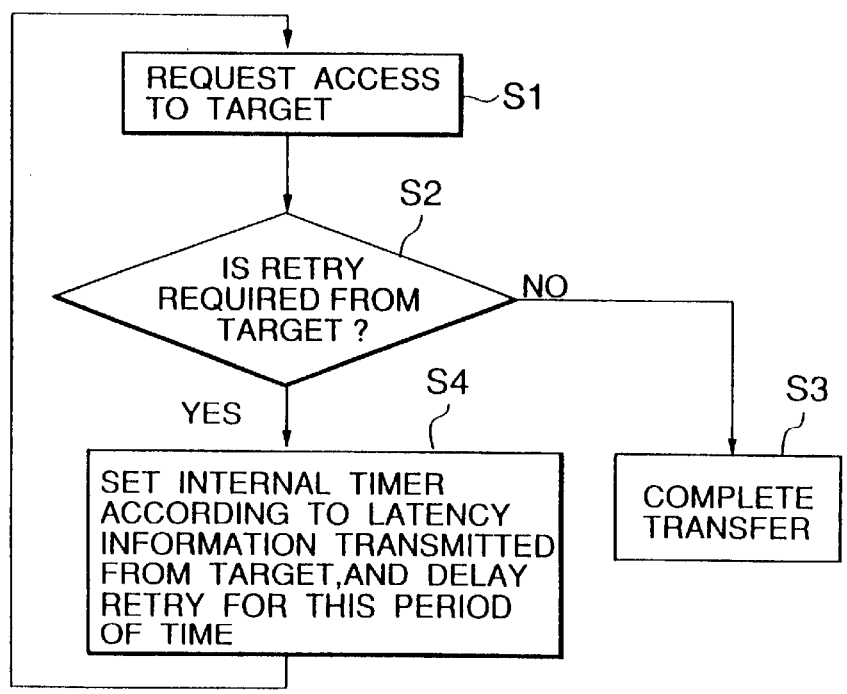
FIG. 4 is a flow-chart for describing the operation of an initiator in the PCI bus system in FIG. 3.

The operation of an initiator in a PCI bus system relating to one mode for implementing the present invention is now described with reference to FIG. 4. The initiator comprises all the processing devices, such as the CPU 11, and the illustrated processes are actually carried out by the processing devices provided in the initiator. Firstly, at step S1, an access request is set to the target, and at step S2, it is judged whether or not there was a retry message from the target. If there is no retry, the process moves to step S3, where data is transferred from the target to the initiator until it is completed.

On the other hand, in step S2, if there is a retry from the target, the initiator processing moves to step S4. At step S4, the initiator sets an internal timer based on the latency information sent by the target, the retry is deferred for the period of time specified by the latency information, and when the specified time period has elapsed, the initiator returns to step S1 and transmits an access request to the target. During the specified time period, the PCI bus is released and the initiator is able to transfer data to a different target.

Next, the operation of the target is described. Firstly, in a simple target, as described above, no problems of any kind arise if the time taken from receiving access from the initiator until data transfer is treated as a uniform value. In this case, a latency register containing latency information should be set previously in the target. On the other hand, in the case of an expansion device 20 connected via an expansion bus bridge 19, information relating to each of the expansion devices 20 connected to the expansion bus 18 is stored at the relevant expansion bus bridge 19, and the expansion bus bridge 19 controls each expansion bus device 20 on the basis of the information relating thereto.

Figure 5:
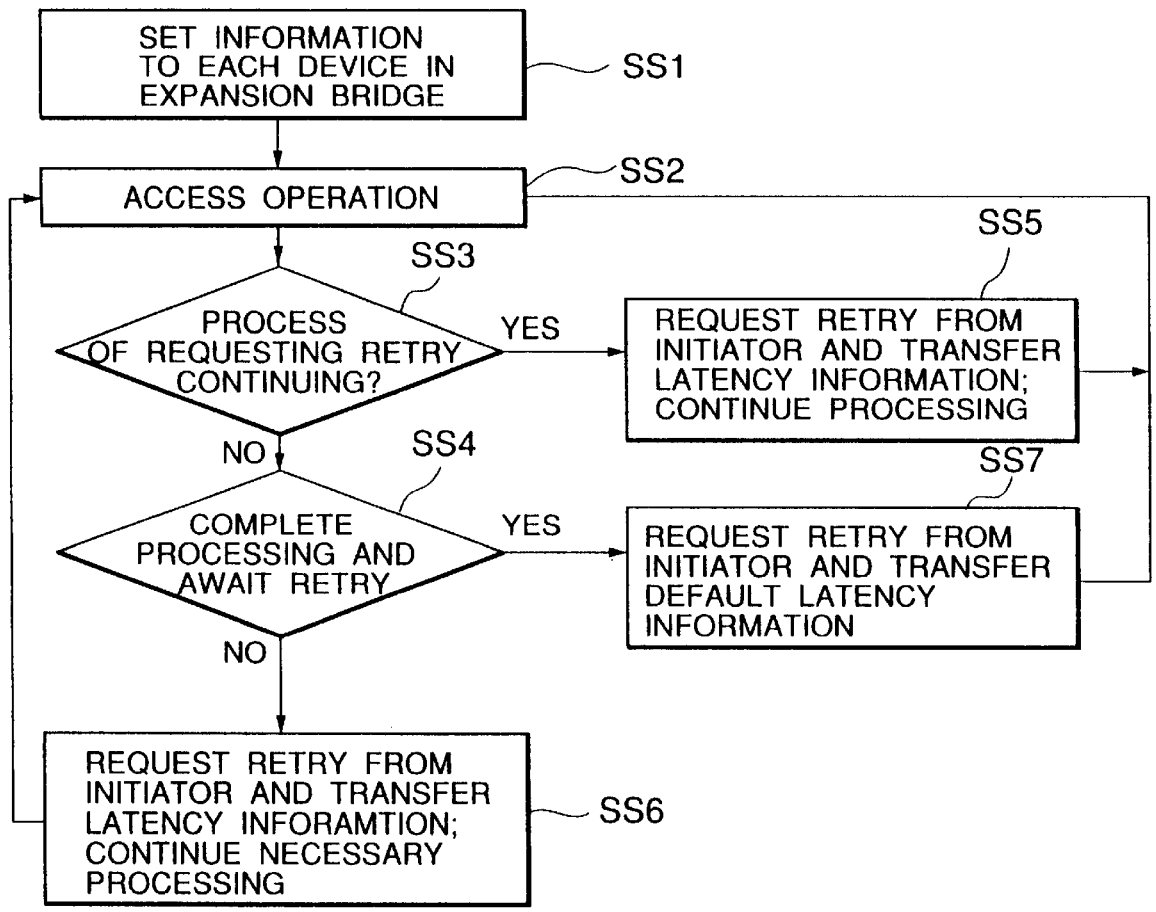
FIG. 5 is a flow-chart for describing the operation of a target in the PCI bus system in FIG. 3.

Below, an operation in a situation where an expansion bus bridge is used 19 is described with reference to FIG. 5. In this case, as indicated at step SS1, device information relating to each expansion bus device 20 connected to a expansion bus bridge 19 is set in a register provided in that expansion bus bridge 19. Device information is set manually in this register in the expansion bus bridge 19 in accordance with expansion bus protocols, or the like.

Here, if an access to a particular expansion device 20 is generated, then each expansion bus bridge 19 recognizes the arrival of the access at step SS2, and it calculates latency information corresponding to this access and then moves to step SS3. The calculated latency information is transmitted to the initiator when a retry request is submitted by the initiator.

Next, at step SS3, the expansion bus bridge 19 determines whether or not the process of requesting a retry is continuing, and if this process is not continuing, then it moves to step SS4. However, if the expansion bus bridge 19 determines that processing relating to a retry is continuing, then at step SS5 it issues a retry request to the initiator, as well as outputting latency information, and then continues its processing.

However, if processing relating to a rotary is not continuing, then at step SS4 the expansion bus bridge 19 determines whether it has completed processing and is in a standby state for a retry. If it is not in a standby state for a retry, then the process moves to step SS6, where a retry request is transmitted to the initiator along with atency information and necessary processing is continued, whereupon the process returns to step SS2.

If it is determined at step SS4 that the expansion bus bridge 19 is in a retry standby state, than it transmits a retry request to the initiator along with default latency information, and then returns to step SS2.

In either case, if an access is received from a different device, the expansion bus bridge 19 transfers the value until completion of the transaction currently in progress, in other words, the value transmitted to the initiator making access first.

The latency information transmitted by the target is calculated in the following manner. Firstly, if the target is a PCI device 171, 172, then the intrinsic latency information corresponding to each PCI device is stored in its latency register, whereas if the target is an expansion bus bridge 19, the latency information for that bridge is calculated as the sum of the time periods required for reading out necessary data values from the expansion devices.

This latency information is stored in the PCI device 171, 172 or the expansion sub bridge 19, and is referred to when a retry arrives from the initiator and processing has not yet been completed. Firstly, if the target is a PCI device, the intrinsic latency information is transmitted to the initiator, and if the target is an expansion bus bridge 19, latency information calculated from the time periods required for reading out the remaining data from arrival of a retry until completion is output to the initiator as latency information.

The foregoing description related chiefly to cases where data is read out from a target, and this is because in cases of writing data, a write buffer can be used and hence the effect on performance is small. Therefore, an actual system may be composed such that latency information is transmitted by the target to the initiator only in cases of reading out data.

In the foregoing mode of implementation, the description related only to a system which communicates latency information in the form of a specific value, such as a number of clocks, or the like.

Figure 6:
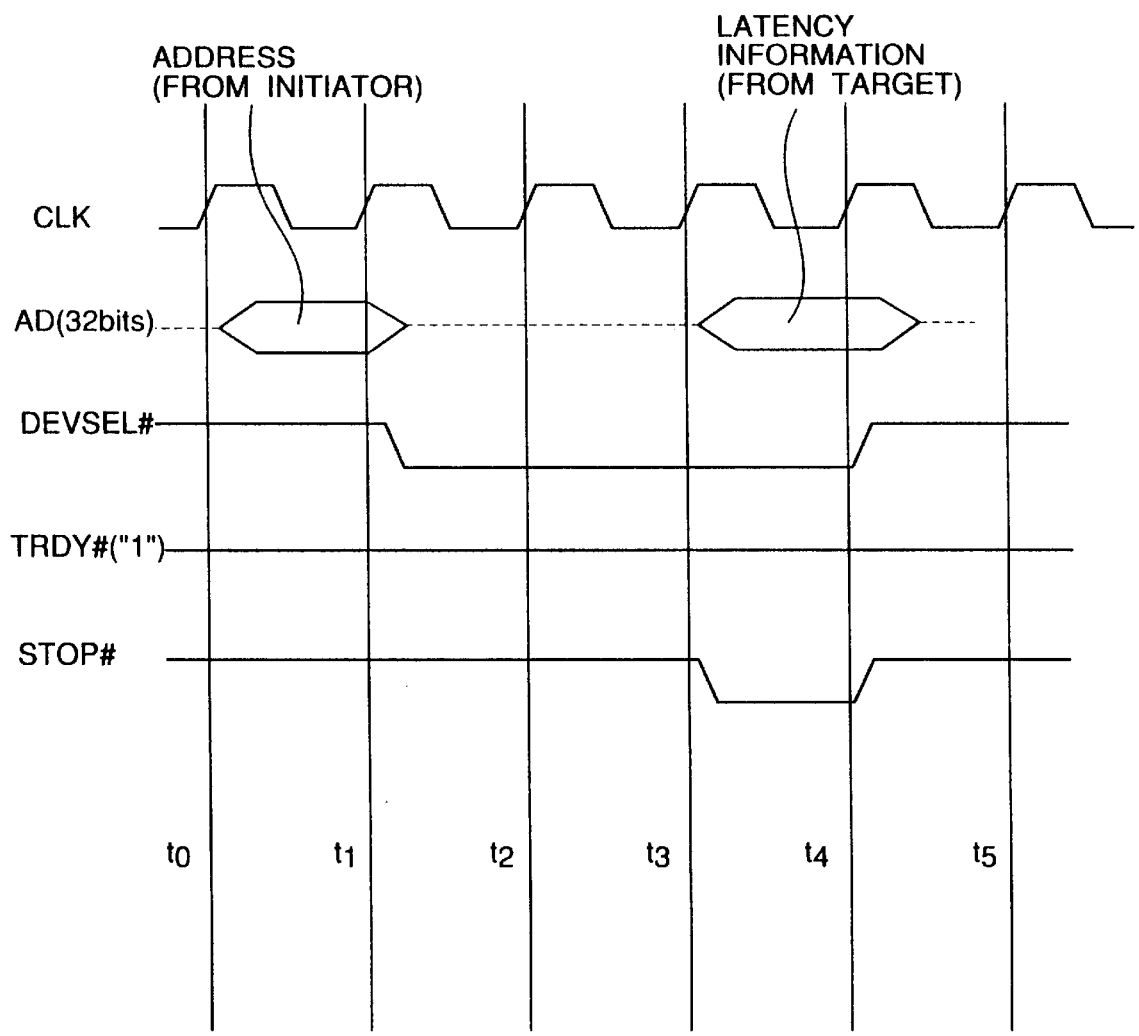
FIG. 6 is a waveform chart for describing one example of a method for transferring latency information relating to the present invention.

Moreover, in a PCI system, since it is possible to use independent signals called side band signals on the mother board, a composition can be adopted which transmits latency information by means of these side band signals. Alternatively, it is also possible to use an undefined section of the PCI bus protocol. Here, description is made with reference to FIG. 6 with the case where the undefined section of the PCI bus protocol is used. Firstly, as described above, the AD line is used in a time division fasion and is put into an address phase (e.g., to–t1) and a data phase (e.g., t3–t4). Furthermore, in cases where data is read from the target, the AD line is driven by the target in the data phase, and during a retry (t3–t4), usually, meaningless information of some kind is transmitted onto the AD line. Using this read-out period (t3–t4), by deactivating TRDY# during t3–t4, and asserting the STOP# signal, while simultaneously outputting latency information from the target to the AD line, as illustrated in FIG. 6, the latency information can be transmitted to the initiator. By deactivating TRDY# in this way, it is possible to make a differentiation from normal data read-out.

The PCI bus system relating to the present invention also include, of course, systems wherein the target actively issues a reinitiation request.

As described above, according to the present invention, in a PCI bus system which transmits data from a target in response to an access request from an initiator, it is possible to shorten the time for which the PCI bus is occupied, by storing latency information indicating the time period required from access until data transfer, and transmitting this latency information to the initiator, and therefore a merit is obtained in that PCI bus performance is raised.

What is claimed is:

1. A PCI bus system comprising:
   an initiator; and
   a target which transmits data to said initiator via a PCI bus in response to access from said initiator and which sends the initiator a retry request when the target can not quickly respond to the access, wherein said target comprises:
      means for storing latency information indicating a time interval required until said data is transmitted after receiving said access from said initiator; and
      means for transmitting together with said retry request said latency information to said initiator on reception of said access from said initiator.

2. The PCI bus system according to claim 1, wherein said initiator makes access to said target again after the time interval indicated by said latency information has elapsed.

3. The PCI bus system according to claim 1, wherein said initiator is a CPU connected to said PCI bus via interface operable as a host PCI bridge, while said target is a PCI device connected to said PCI bus.

4. The PCI bus system according to claim 1, wherein said target is an explanation bus bridge connected to said PCI bus.

5. The PCI bus system according to claim 4, wherein an expansion bus device is connected to said expansion bus bridge via an expansion bus.

6. The PCI bus system according to claim 1, wherein said initiator defers access to said target for the time interval indicated by said latency information, when said initiator receives said latency information from said target.

7. The PCI bus system according to claim 1, wherein said target further comprises means for computing said latency information a time interval required until said data is transmitted after receiving said access from said initiator.

8. A target, connected to a PCI bus, which transmits data to an initiator via said PCI bus in response to an access from said initiator and which sends the initiator a retry request when the target can not quickly respond to the access request, said target comprising:
   means for storing latency information indicative of a time interval from reception of an access request supplied via said PCI bus to data transmission; and
   means for transmitting together with said retry request the latency information onto said PCI bus in response to said access request.

9. A target, connected to a PCI bus, which transmits data to an initiator via said PCI bus in response to an access request from said initiator and which sends the initiator a retry request when the target can not quickly respond to the access request, said targeting comprising:
   means for calculating latency information indicative of a time interval from reception of an access request supplied via said PCI bus to data transmission; and
   means for transmitting together with said retry request the latency information onto said PCI bus in response to said access request.

* * * * *